US010166826B2

(12) United States Patent
Gray

(10) Patent No.: US 10,166,826 B2
(45) Date of Patent: Jan. 1, 2019

(54) UNIVERSAL HITCH ADAPTER AND SYSTEM

(71) Applicant: Roderick James Gray, Fort Lauderdale, FL (US)

(72) Inventor: Roderick James Gray, Fort Lauderdale, FL (US)

(*) Notice: Subject to any disclaimer, the term of this patent is extended or adjusted under 35 U.S.C. 154(b) by 338 days.

(21) Appl. No.: 15/133,949

(22) Filed: Apr. 20, 2016

(65) Prior Publication Data

US 2017/0305214 A1 Oct. 26, 2017

(51) Int. Cl.
| | | |
|---|---|---|
| B64F 1/22 | (2006.01) | |
| B60D 1/24 | (2006.01) | |
| B60P 3/11 | (2006.01) | |
| B60W 30/18 | (2012.01) | |
| B60D 1/02 | (2006.01) | |
| B60D 1/62 | (2006.01) | |

(52) U.S. Cl.
CPC .............. *B60D 1/248* (2013.01); *B60D 1/02* (2013.01); *B60D 1/62* (2013.01); *B60P 3/11* (2013.01); *B60W 30/18* (2013.01); *B64F 1/224* (2013.01); *B64F 1/225* (2013.01); *B60W 2720/106* (2013.01); *Y02T 50/826* (2013.01)

(58) Field of Classification Search
CPC . B60D 1/248; B60D 1/02; B60D 1/62; B60D 1/64; B60D 1/224; B60D 1/244; B64F 1/224; B64F 1/225; B64F 1/22; B60W 30/18; B60W 2720/106; Y02T 50/826; B54F 1/004; G01G 19/07
USPC ......................... 280/432, 449, 451; 180/904
See application file for complete search history.

(56) References Cited

U.S. PATENT DOCUMENTS

| | | |
|---|---|---|
| 3,992,934 A | 11/1976 | Clark |
| 4,113,041 A | 9/1978 | Birkeholm |

(Continued)

FOREIGN PATENT DOCUMENTS

| | | |
|---|---|---|
| CN | 104 334 377 A | 2/2015 |
| DE | 20 2011 002748 U1 | 4/2011 |

(Continued)

OTHER PUBLICATIONS

International Search Report and Written Opinion of the International Searching Authority dated Jun. 29, 2017 issued in corresponding PCT Application Serial No. PCT/US2017/028309, consisting of 10-pages.

*Primary Examiner* — Joseph M Rocca
*Assistant Examiner* — Daniel S Yeagley
(74) *Attorney, Agent, or Firm* — Christopher & Weisberg, P.A.

(57) ABSTRACT

A universal hitch adapter system includes a universal hitch adapter with at least one force sensor operable to measure push-and-pull forces and coupled to a) one of a front end and a rear end of an aircraft tractor and b) an aircraft tow bar coupled to a nose gear of an aircraft. The system also including a memory; a user input interface operable to receive a user's selection of one of a plurality of aircrafts stored in the memory and a user's input associated with one of a shear pin; a processor operably configured to determine at least one shear pin breaking force threshold for each of the plurality of aircrafts based on the user's input; and an indicator operable to emit an alert as a result of the force sensor measuring a force that meets or exceeds the at least one shear pin breaking force threshold.

20 Claims, 11 Drawing Sheets

(56) References Cited

U.S. PATENT DOCUMENTS

| | | | |
|---|---|---|---|
| 4,917,564 A | 4/1990 | Pollner et al. | |
| 4,955,777 A * | 9/1990 | Ineson | B64F 1/22 180/904 |
| 4,997,331 A * | 3/1991 | Grinsted | B64F 1/22 180/14.1 |
| 5,048,625 A * | 9/1991 | Birkeholm | B64F 1/22 180/14.6 |
| 6,305,484 B1 * | 10/2001 | Leblanc | B60T 7/16 180/167 |
| 6,675,920 B1 * | 1/2004 | Diez | B60T 7/042 180/14.6 |
| 6,739,611 B2 * | 5/2004 | Gisinger | B62D 53/08 280/432 |
| 7,973,671 B2 | 7/2011 | Cloutier et al. | |
| 8,024,980 B2 | 9/2011 | Arms et al. | |
| 8,515,594 B2 | 8/2013 | Perry et al. | |
| 8,818,739 B2 | 8/2014 | Zakrzewski et al. | |
| 8,820,768 B2 | 9/2014 | Grizzle | |
| 9,067,691 B2 | 6/2015 | Pugh et al. | |
| 9,108,746 B2 | 8/2015 | Schmidt et al. | |
| 2008/0177435 A1 | 7/2008 | Caporali et al. | |
| 2010/0140392 A1 * | 6/2010 | Perry | B64C 25/50 244/50 |
| 2011/0073706 A1 * | 3/2011 | Katsumata | B64F 1/22 244/50 |
| 2011/0224845 A1 * | 9/2011 | Perry | B64F 1/22 701/2 |
| 2012/0004805 A1 * | 1/2012 | Gray | B60T 8/1708 701/33.4 |
| 2012/0326894 A1 * | 12/2012 | Schmidt | B64C 25/50 340/960 |
| 2015/0165849 A1 * | 6/2015 | Tanaka | B60D 1/07 280/515 |
| 2015/0262492 A1 | 9/2015 | Barnes | |
| 2015/0329119 A1 * | 11/2015 | Sujan | F02D 41/08 701/54 |

FOREIGN PATENT DOCUMENTS

| | | |
|---|---|---|
| WO | 89/03343 A1 | 4/1989 |
| WO | WO2006067442 A1 | 6/2006 |
| WO | WO2009116966 A1 | 9/2009 |

* cited by examiner

100

100

100

100

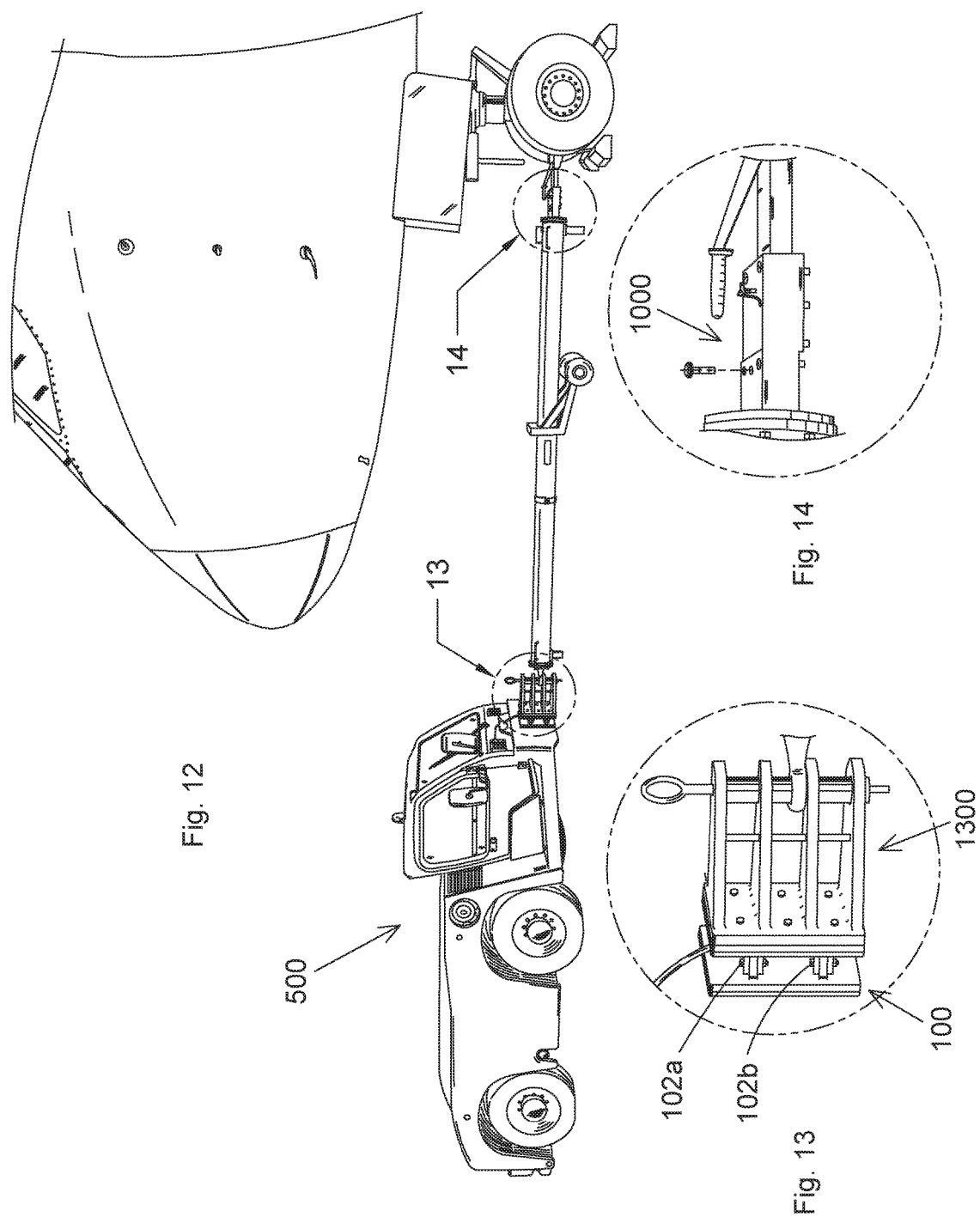

UNIVERSAL HITCH ADAPTER AND SYSTEM

FIELD OF THE INVENTION

The present invention relates generally to vehicle hitch adapters, and, more particularly, relates to a universal hitch adapter system for aircraft tractors to prevent nose gear shear pin failure on various aircrafts towed by such aircraft tractors.

BACKGROUND OF THE INVENTION

It is known that tractors are often used to tow aircraft on the ground from one location to another. Such tractors typically use a tow bar with a coupler on one end and a tow bar head on the other end. The coupler couples to the hitch of the tractor and the tow bar head couples to a nose gear of the aircraft to be towed. Aircraft nose gears have a certain threshold force value that cannot be exceeded during the push and pull phase of a tractor maneuvering the towed aircraft on the ground. Exceeding this threshold force value can damage the nose gear/landing to the extent that it can malfunction after take-off, or render it unable to cycle correctly making it very dangerous for operation. If such damage to the nose gear is detected, the nose gear is required to be tested and certified prior to flight departure. This repair of the nose gear and testing for certification prior to any use in flight represents a significant monetary expense, including the time expended that the aircraft is unable for commercial use. If the damage to the nose gear goes undetected, it can result in serious problems during flight/take-off/landing that could, unfortunately, result in a crash or other dangerous situations. Accordingly, it is very important for aircraft tractors to tow aircrafts without exerting forces that would damage or wear away at the nose gear or nose gear shear pins. Unfortunately, prior art methods and devices are lacking.

Use of aircraft tractors to move aircrafts, rather than the aircraft's own engines, became desirable in order to save on fuel. Initially, tractor speeds during towing efforts had been previously restricted to very slow speeds (i.e., less than 10 miles/hour). It became desirable to increase such speeds, even for fully loaded aircrafts, to increase the viability of taxiing fully loaded aircrafts by tractor, rather than the aircraft's engine, for additional fuel saving. However, this would increase forces between the aircraft and the tractor, which could result in too much force being transmitted to the nose gear. In addition, such higher speeds would increase the risks associated with jack-knifing. Also, it was not desirable to leave the control over the aircraft solely in the hands of the tractor driver, who may not have been as skilled and responsible as a pilot.

One solution was developed in U.S. Pat. No. 4,113,041 (Birkeholm), which included a sensing element within an aircraft tow bar that measures the traction and pressure forces transmitted between the tractor and the aircraft and a control unit that automatically adjusted the traction-effect of the tractor, as well as, the braking of the aircraft, to keep the tow bar forces within a predetermined permissible level. For safety, the Birkeholm system included an emergency release system that separated the aircraft from the tractor in response to the tow bar forces exceeding a predetermined range. Unfortunately, there are some major drawbacks to this solution. By being integrated with the aircraft and the tow bar, the Birkholm system was not flexible for use with other aircraft, as well as, other tow bars. In addition, some drivers and pilots are not comfortable with such automatic traction adjustment and aircraft braking controlled by an electronic control unit, which is subject to error.

In order to avoid costly damage to the nose gear by transmitting forces that are too high for the nose gear to sustain, it is also known to use a towing pin, also referred to as a shear pin, as a mechanical fuse so that such high forces can break the shear pin, rather than the nose gear. However, this solution is not perfect. In order to guarantee that a shear pin will break when the situation requires it, such as when the steering angle of the wheels on the nose gear is considerable, sheer pins are manufactured with a rather large safety margin, which leads to pins breaking frequently, and sometimes unnecessarily. In addition, even though breaking the shear pin breaks the connection between the aircraft and the tow bar (and, thereby, the tractor), which terminates the application of excessive forces to the nose gear, it is nonetheless a hazard as the aircraft may not completely come to a rest immediately after the connection is terminated, and may continue to roll on its own momentum.

One solution was developed in U.S. Pat. No. 9,108,746 (Schmidt), which disclosed a shear pin with a force sensor and an accelerometer that measured the shear pin's angle of inclination. Schmidt's shear pin also calculated a force threshold as a function of the measured force and the angular orientation of the nose gear wheels, as determined by the accelerometer, generating an alarm when the force threshold was reached or exceeded.

Unfortunately, these prior art devices and systems are specific to a particular aircraft. Such devices and systems are not adaptable and flexible so that a single instance of a device/system may be tied to the tractor and configured for interchangeable use, on-the-fly, with multiple aircrafts, multiple shear pins, and multiple tow bars.

In particular, towhead shear pins are fitted to an individual aircraft towhead and are manufactured so as to shear upon a predetermined force being met or exceeded. Such shearing of the shear pin is intended to be an alert to the tractor driver that a safe force has been exceeded and inspection, as well as, replacement of the shear pin is required. Accordingly, failure of the shear pin itself is undesirable.

Therefore, a need exists to overcome the problems with the prior art as discussed above.

SUMMARY OF THE INVENTION

The invention provides a universal hitch adapter and system that overcomes the hereinafore-mentioned disadvantages of the heretofore-known devices and methods of this general type and that prevents sheer pin failures.

With the foregoing and other objects in view, there is provided, in accordance with the invention, an aircraft tractor including a front end and a rear end opposite the front end; an aircraft tractor hitch; and a universal hitch adapter system. In one embodiment, the universal hitch adapter system may include at least one force sensor disposed between one of the front end and the rear end and the aircraft tractor hitch; at least one input operable to receive force measurements from the force sensor; a memory storing a plurality of aircrafts thereon; a user input interface operable to receive a user's selection of one of the plurality of aircrafts stored in the memory; and processor communicatively coupled to the input, the memory, and the user input interface and operably configured to determine, based on the user's selection of one of the plurality of aircrafts, at least one sheer pin breaking force threshold.

In accordance with another feature, an embodiment of the present invention further includes an indicator communicatively coupled to the processor and operably configured to emit an alert as a result of the force sensor measuring a force transmitted on an aircraft tow bar coupled to the aircraft tractor hitch that meets or exceeds the shear pin breaking force threshold.

In accordance with another feature, an embodiment of the present invention includes an accelerator pedal; and an electronic control line communicatively coupled to the accelerator pedal. Further, in accordance with one embodiment of the present invention, the processor is communicatively coupled to the electronic control line and the processor is further operable to automatically prevent acceleration of the aircraft tractor, via the electronic control line, as a result of the force sensor measuring a force that meets or exceeds the shear pin breaking force threshold.

In accordance with yet another feature, an embodiment of the present invention includes an accelerator pedal; and an electronic control line communicatively coupled to the accelerator pedal. Further, in accordance with one embodiment of the present invention, the processor is communicatively coupled to the electronic control line and the processor is further operable to automatically prevent acceleration of the aircraft tractor, via the electronic control line, as a result of the force sensor sensing an aircraft load without the processor having received the user's selection of one of the plurality of aircrafts.

In accordance with another feature of the present invention, the universal hitch adapter further includes a steel insert operably configured to support the force sensor, the steel insert including a first coupling member and a second coupling member opposite the first coupling member with the force sensor interposed therebetween; and the first coupling member is coupled to the front end of the aircraft tractor and the second coupling member is coupled to the aircraft tractor hitch.

In accordance with another feature of the present invention, the steel insert is of a hardened steel material.

In accordance with a further feature of the present invention, the steel insert further includes at least two parallel stress plates, each of the parallel stress plates defining an aperture through which the force sensor is disposed and each of the parallel stress plates is translatable relative to one another about the force sensor so as to impart push-and-pull forces from an aircraft tow bar on force sensor.

In accordance with another feature of the present invention, an embodiment includes a universal aircraft tractor hitch adapter system with at least one force sensor disposed between one of a front end and a rear end of an aircraft tractor and an aircraft tractor hitch; and a universal control device. In accordance with one embodiment, the universal control devices includes at least one input operable to receive force measurements from the force sensor; a memory storing a plurality of aircrafts thereon; a user input interface operable to receive a user's selection of one of the plurality of aircrafts stored in the memory; and at least one processor communicatively coupled to the input, the memory, and the user input interface and operably configured to determine, based on the user's selection of one of the plurality of aircrafts, at least one sheer pin breaking force threshold.

In accordance with an additional feature of the present invention, the processor is operably configured to transmit an alert as a result of the force sensor measuring a force transmitted on an aircraft tow bar coupled to the aircraft tractor hitch that meets or exceeds the shear pin breaking force threshold.

In accordance with yet another feature of the present invention, an embodiment includes a steel insert operably configured to support the force sensor, the steel insert including a first coupling member and a second coupling member opposite the first coupling member with the force sensor interposed therebetween, the first coupling member coupled to the front end of the aircraft tractor and the second coupling member coupled to the aircraft tractor hitch.

In accordance with yet another feature of the present invention, the processor is further operable to automatically prevent acceleration of the aircraft tractor as a result of the force sensor sensing an aircraft load without the processor having received the user's section of one of the plurality of aircrafts.

In accordance with the present invention, a method for an aircraft tractor to safely tow aircrafts includes steps of measuring, by a force sensor disposed between one of a front end and a rear end of an aircraft tractor and an aircraft tractor hitch coupled to an aircraft tow bar, push-and-pull forces transmitted on the aircraft tow bar; providing a force sensor output, by the force sensor, to at least one processor; and receiving, by the processor, a user's first selection of one of a plurality of aircrafts stored in a memory communicatively coupled to the processor. In additional embodiments, the method may further include steps of determining, by the processor, at least one shear pin breaking force threshold associated with the user's first selection of one of the plurality of aircrafts; and providing, by an indicator communicatively coupled to the processor, an alert as a result of the force sensor measuring a force that meets or exceeds the shear pin breaking force threshold.

In accordance with another feature, an embodiment of the present invention also includes a step of integrating the processor and the indicator into an aircraft tractor.

In accordance with yet another feature, an embodiment of the present invention includes steps of coupling a tow bar head of the aircraft tow bar to a nose gear of an aircraft; and coupling a shear pin to the tow bar head.

In accordance with a further feature of the present invention, an embodiment further includes a step of revising, by the processor, the shear pin breaking force threshold based on a user's second selection of a second one of the plurality of aircrafts, different from the user's first selection of one of the plurality of aircrafts.

In accordance with another feature of the present invention, an embodiment further includes automatically preventing, by the processor, acceleration of an aircraft tractor on which the force sensor is disposed as a result of the force sensor measuring a force that meets or exceeds the shear pin breaking force threshold.

In accordance with yet another feature of the present invention, an embodiment includes a step of receiving, by the processor, a shear pin breaking force threshold input by the user.

Although the invention is illustrated and described herein as embodied in a universal hitch adapter and system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the universal hitch adapter from end to an opposing end. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 12 a side perspective view of another embodiment of a universal hitch adapter coupled to a multi-level hitch of an aircraft tractor and towing a large aircraft via an aircraft tractor tow bar in accordance with the present invention;

FIG. 13 is an enlarged view of the multi-level hitch and the universal hitch adapter of FIG. 12 in accordance with an embodiment of the present invention; and FIG. 14 is an enlarged view of a tow bar head and a shear pin of FIG. 12 in accordance with an exemplary embodiment of the present invention.

DETAILED DESCRIPTION

Figure 1:
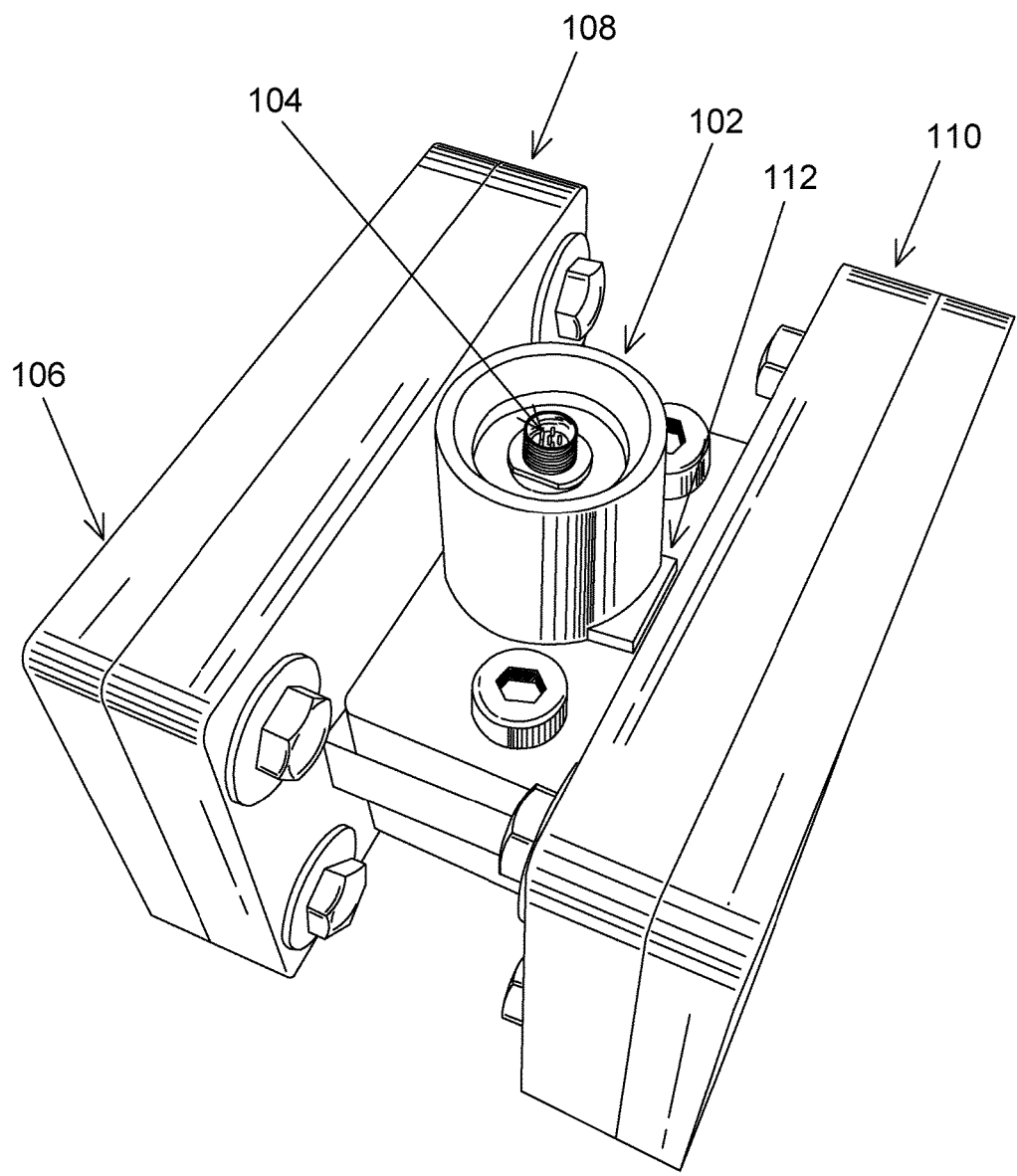
FIG. 1 is a perspective view of a universal hitch adapter in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient universal aircraft tractor hitch adapter system. Embodiments of the invention provide a force sensor coupled to an aircraft tractor hitch that transmits push-and-pull force measurements to a universal hitch adapter control panel. In addition, embodiments of the invention provide that the universal hitch adapter control panel include a memory storing a plurality of aircrafts thereon and a user input interface that allows a user (e.g., an aircraft tractor driver) to select one of the plurality of aircrafts that he/she is currently preparing to tow. In embodiments of the present invention, the universal hitch adapter control panel may also include a processor that determines at least one sheer pin breaking force threshold based on the driver's selected aircraft. Additional embodiments of the present invention include an alarm that alerts the aircraft tractor driver as a result of the processor determining that a measured push-and-pull force from the force sensor has met or exceeded the sheer pin breaking force threshold determined by the processor.

Figure 2:
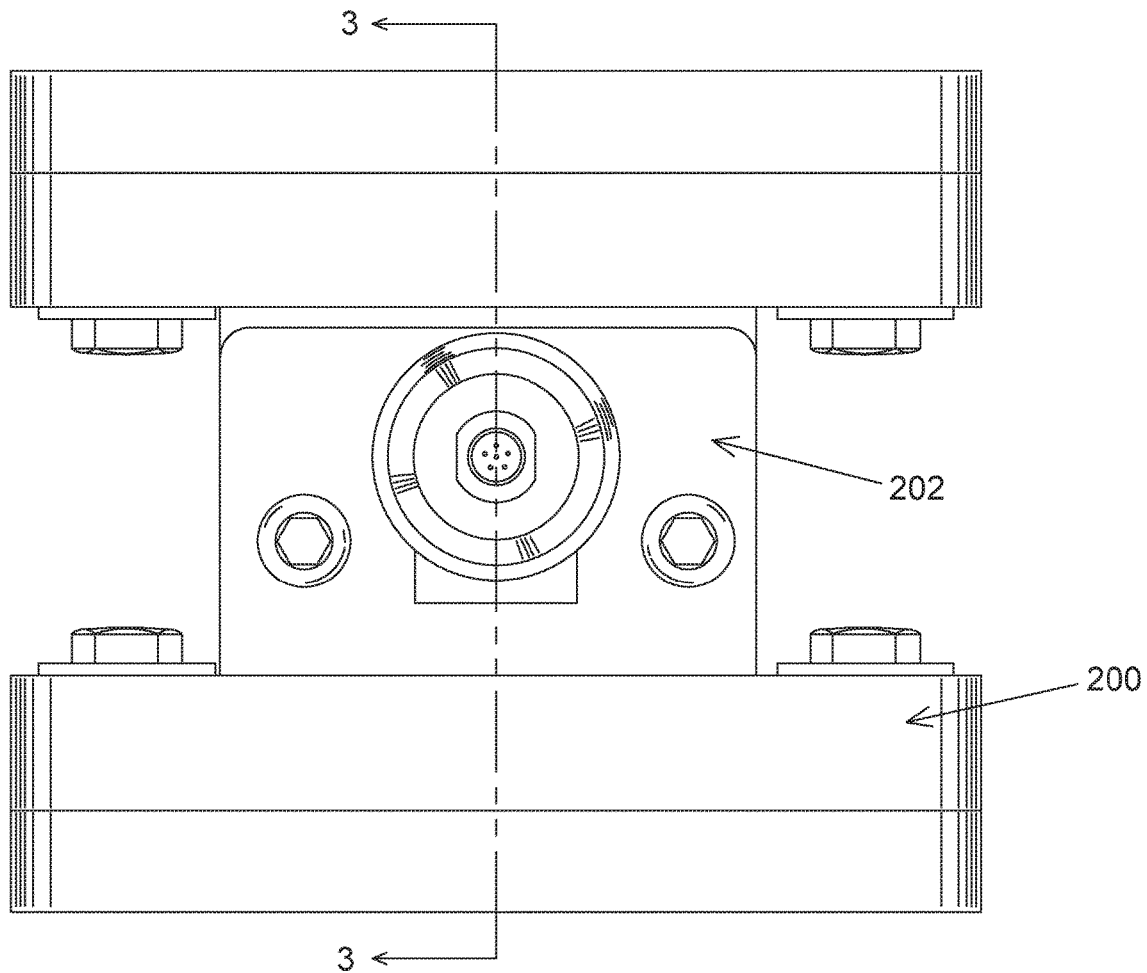
FIG. 2 is a top plan view of the universal hitch adapter of FIG. 1 in accordance with the present invention.

Referring now to FIGS. 1-2, one embodiment of the present invention is shown in a perspective view and a top plan view, respectively. FIGS. 1-2 show several advantageous features of the present invention, but, as will be described below, the invention can be provided in several shapes, sizes, combinations of features and components, and varying numbers and functions of the components. The first example of a universal aircraft tractor hitch adapter 100, as shown in FIGS. 1-2, includes at least one force sensor 102.

In one embodiment, the force sensor 102 is operable to measure tension and compression forces (also known in the art as "linear shear forces" and "push-and-pull forces"). In a preferred embodiment, the force sensor 102 may be formed as a strain gauge transducer. In another embodiment, the force sensor 102 may be formed as other types of force sensors, such as, for example, a piezoelectric transducer, a pneumatic load cell, and the like. Importantly, the force sensor 102 is adapted to be able to withstand repeated and prolonged high-stress forces associated with pulling/towing large aircraft. Accordingly, in one embodiment, the force sensor 102 may be made of a steel material (e.g., a hardened steel material). In another embodiment, the force sensor 102 may be made of another hardened metallic material. In yet further embodiments, the force sensor 102 may be made of another non-metallic rugged material suitable for transmitting repeated and continuous high-stress forces associating with towing aircraft.

In one embodiment, the force sensor 102 is shaped as a pin or bolt. Advantageously, this shape of the force sensor 102 allows the force sensor 102 to be readily adapted and readily replaceable/interchangeable as a coupling member upon which linear shear forces may be applied. Stated another way, in the field of heavy-duty machinery, such as aircraft tractors, there are necessarily junctures at which high-stress operational forces are repeatedly and continuously applied and which are transmitted by pivoting pins, bolts, or other similar fasteners. According, these juncture points (e.g., hitch) would benefit from force monitoring in order to detect possible shear conditions. Providing the force sensor 102 in the shape of a pin or bolt allows the force sensor 102 to be readily adapted to be integrated into such juncture points. In an alternative embodiment, the force sensor 102 may be formed as other shapes and sizes.

In one embodiment, the force sensor 102 includes a plurality of pins 104 (or other conductors) operable to transmit sensor output (e.g., linear shear force measurements) to a receiving device such as, for example, a processor or other circuitry. In one embodiment, the force sensor 102 may include 6 pins. In another embodiment, the force sensor 102 may include more or less than 6 pins. In yet another embodiment, the plurality of pins 104 may be provided in a connector shaped and configured to mate with a mating connector cable.

In one embodiment, the universal aircraft tractor hitch adapter 100 further includes an insert 106 operably configured to support the force sensor 102. In one embodiment, the insert 106 is disposed to transmit linear shear force measurements from an aircraft tow bar (not shown) to the force sensor 102. In a further embodiment, the insert 106 may include a first coupling member 108 and a second coupling member 110 opposite the first coupling member 108. In one embodiment, the force sensor 102 is interposed between the first coupling member 108 and the second coupling member 110. Each of the coupling members 108 and 110 may include a respective vertically oriented plate member 200. In another embodiment, each of the coupling members 108 and 110 may also include a respective horizontally oriented plate member 202. In one embodiment, the plate members 200 and 202 may be perpendicular with respect to one another. In a further embodiment, the respective horizontally oriented plate members 202 for each coupling member 108 and 110 may overlap with one another. In one embodiment, each of the horizontally oriented plate members 202 may define an aperture 112 or bore through which at least a portion of the force sensor 102 is disposed. In other words, the stress plates may be parallel with one another. In another embodiment, the horizontally oriented plate members 202 may be considered parallel stress plates. In one embodiment, the parallel stress plates 202 may be disposed translatable relative to one another about the force sensor 102 so as to impart or transmit push-and-pull forces from an aircraft tow bar on the force sensor 102. Stated another way, the respective apertures 112 defined by each plate member 202 may include a diameter slightly larger than a diameter of a portion of the force sensor 102 disposed within the apertures 112. In other words, the plate members 202 may be configured to provide some give or translatability so that push-and-pull forces can be applied to the force sensor 102 via the plate members 202. In other embodiments, the coupling members 108 and 110 may be formed as other shapes, sized, and configurations.

The insert 106 may be made of a steel material adapted for withstanding repeated and prolonged high-stress forces associated with towing aircraft. In another embodiment, the insert 106 may be made of a hardened steel material. Hardening the steel includes a relatively time-consuming process of heating the steel to very high temperatures. In order to harden the steel, the steel must typically include a relatively large amount of carbon. Hardening the steel will toughen the insert 106 and render the insert 106 less susceptible to wearing out over time; an aspect that is important to such heavy-duty aircraft applications. In yet another embodiment, the insert 106 may be made of another hardened metallic material. In yet further embodiments, the insert 106 may be made of another non-metallic rugged material suitable for transmitting repeated and continuous high-stress forces associating with towing aircraft.

Figure 3:
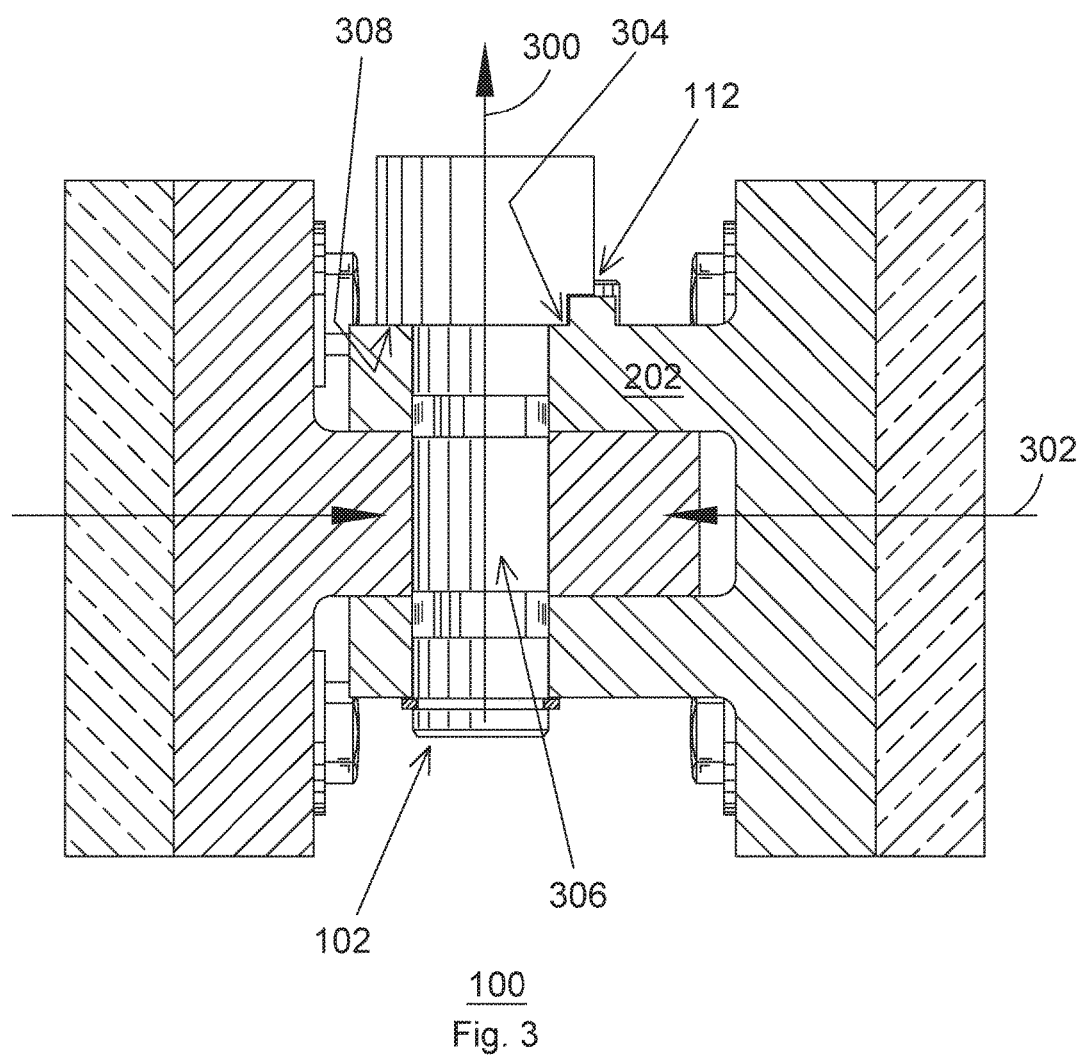
FIG. 3 is a cross-sectional view of the universal hitch adapter of FIG. 1 in accordance with the present invention.

Referring now to FIG. 3, the exemplary universal aircraft tractor hitch adapter 100 is shown in a cross-sectional view. In one embodiment, the force sensor 102 may define a longitudinal axis 300 extending in an elongation direction of the force sensor 102 from a top end to a bottom end thereof. The force sensor 102 may be configured to detect linear push-and-pull forces 302 perpendicular to the longitudinal axis 300. In another embodiment, the force sensor 102 may be configured to detect linear push-and-pull forces substantially perpendicular to the longitudinal axis 300 (90 degrees +/−5%).

In one embodiment, the force sensor 102 may include a rim portion 304 that extends outwardly in a horizontal direction beyond a neck portion 306 of the force sensor 102. In a further embodiment, the plate member 202 may include a ledge portion 308 circumscribing a perimeter of the aperture 112. The rim portion 304 of the force sensor 102 may be operably configured to rest on the ledge portion 308.

Figure 4:
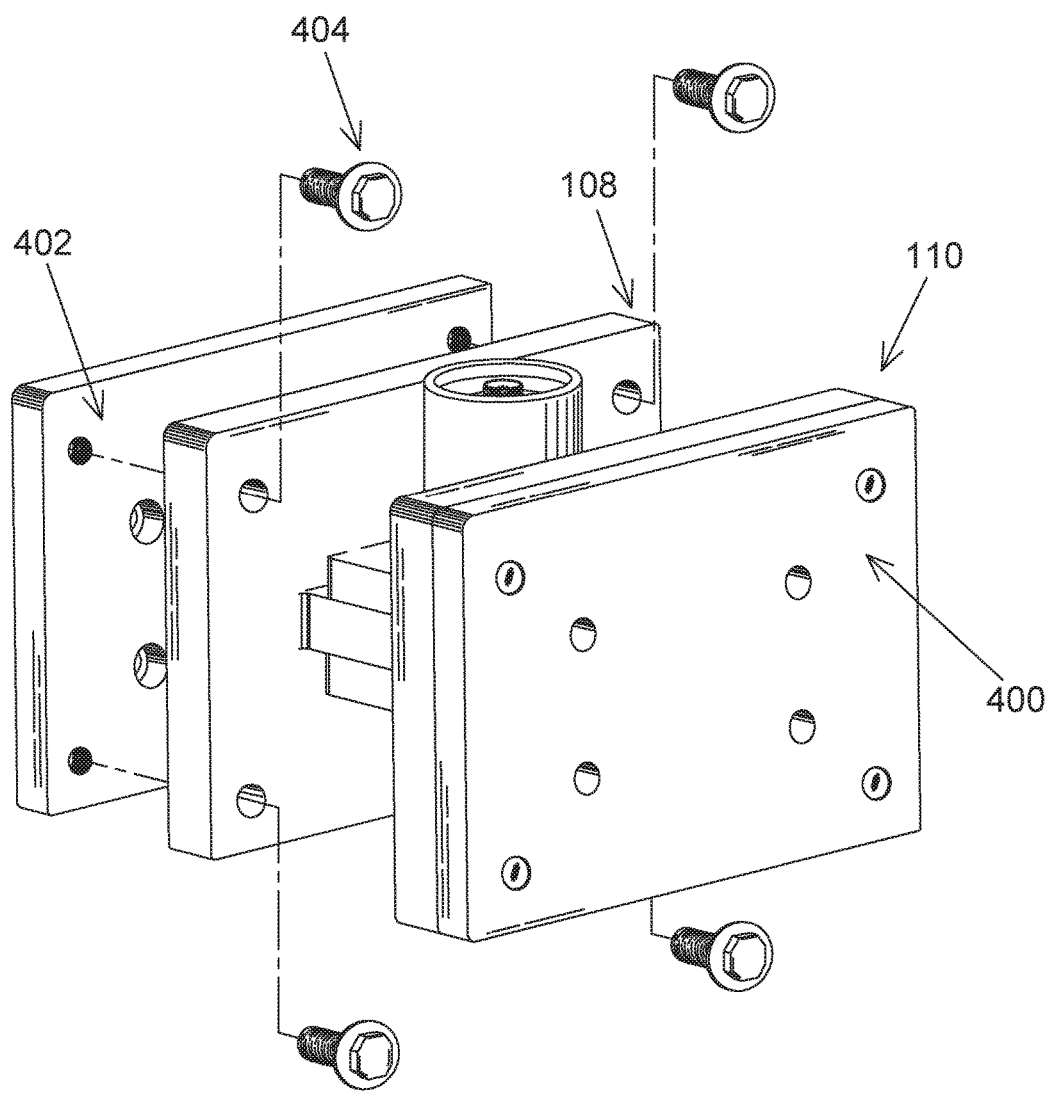
FIG. 4 is an exploded perspective view of the universal hitch adapter of FIG. 1 in accordance with the present invention.

Referring now to FIG. 4, the universal aircraft tractor hitch adapter 100 may include additional support plates 400 and 402. In one embodiment, the support plates 400 and 402 may be made of a steel material adapted for withstanding repeated and prolonged high-stress forces associated with towing aircraft. In another embodiment, the support plates 400 and 402 may be made of a hardened steel material. In yet another embodiment, the support plates 400 and 402 may be made of another hardened metallic material. In yet further embodiments, the support plates 400 and 402 may be made of another non-metallic rugged material suitable for transmitting repeated and continuous high-stress forces associated with towing aircraft. The support plates 400 and 402 may be coupled to the coupling members 108 and 110 via one or more fasteners 404 and may provide additional support to the universal hitch adapter 100. The fasteners 404 may be formed as any type of rugged fastener suitable for heavy-duty aircraft applications, such as, for example, bolts.

Figure 5:
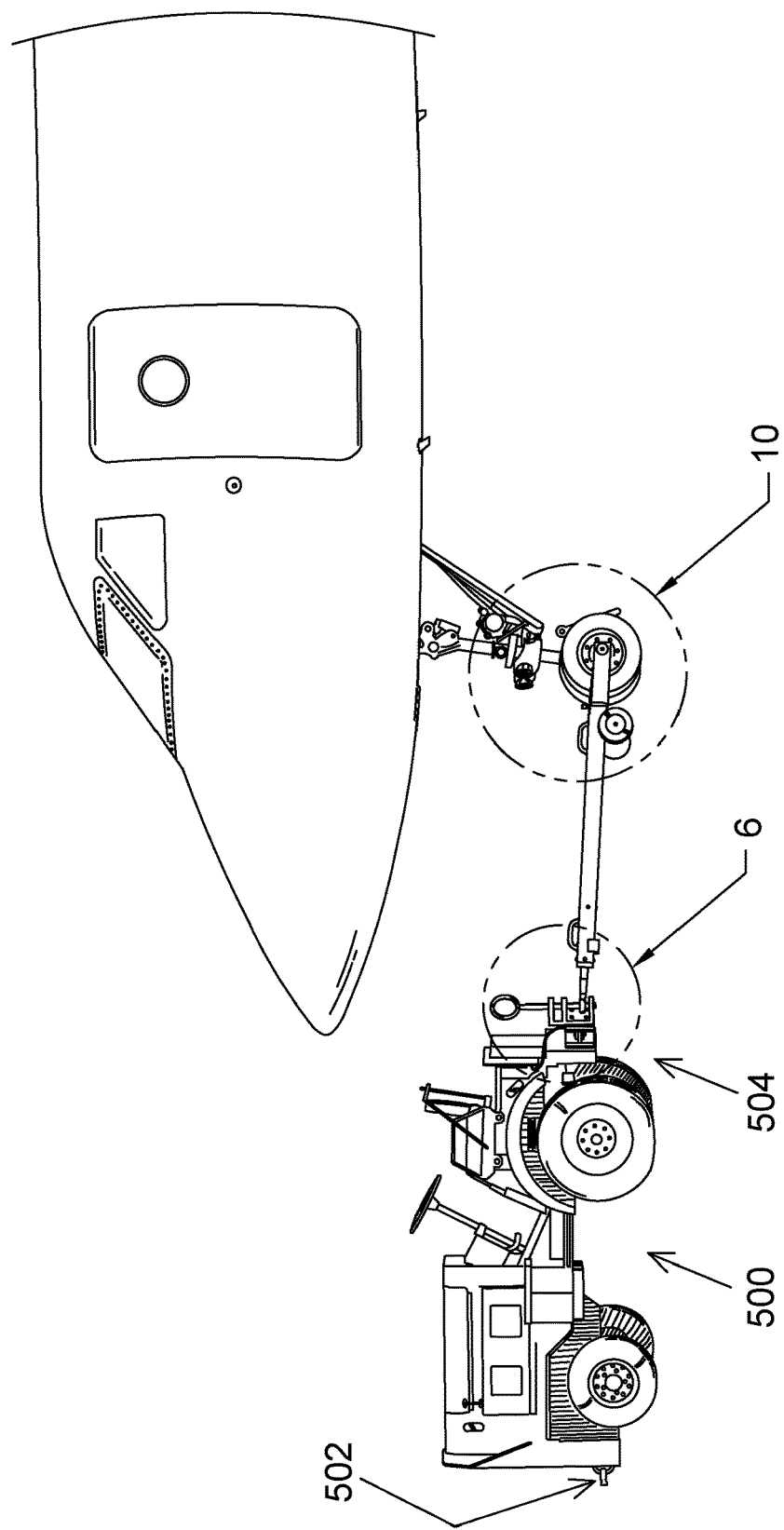
FIG. 5 is a side perspective view of the universal hitch adapter of FIG. 1 coupled to the hitch of an aircraft tractor and towing an aircraft via an aircraft tractor tow bar in accordance with the present invention.
Figure 6:
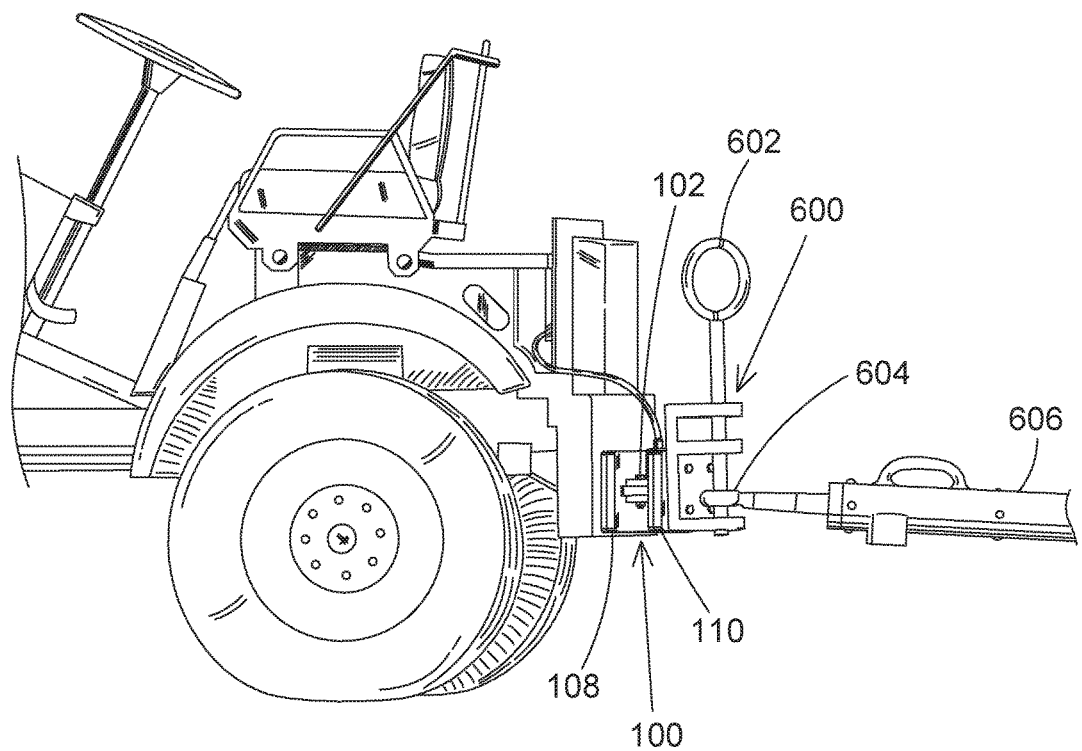
FIG. 6 is an enlarged view of the universal hitch adapter of FIG. 1 coupled to the hitch introduced in FIG. 5 in accordance with an exemplary embodiment of the present invention.

Referring now to FIGS. 5 and 6, an inventive aircraft tractor 500 is illustrated in a schematic view illustrating the universal aircraft tractor hitch adapter 100 installed on the aircraft tractor 500. Aircraft tractors are generally provided in one of two forms: 1) a traditional tractor with a hitch that uses a tow bar to push/pull aircraft, and 2) a towbarless tractor. The towbarless tractor does not use a tow bar, but rather scoops up the nose gear off the ground so that the nose gear rests on top of the tractor itself. Embodiments of the present invention are limited to the traditional tractor and are not designed for use with the towbarless tractor. Accordingly, the aircraft tractor 500 includes an aircraft tractor hitch 600. The aircraft tractor hitch 600 may be disposed on a front end 502 or a rear end 504 of the aircraft tractor 500. The front end 502 may be opposite the rear end 504. The universal aircraft hitch adapter 100 may be disposed between one of the front end 502 and the rear end 504 and the aircraft tractor hitch 600. In the exemplary embodiment depicted in FIGS. 5 and 6, the force sensor 102 is disposed between the front end 502 and the aircraft tractor hitch 600. In an alternative embodiment, the force sensor 102 may be disposed between the rear end 504 and the aircraft tractor hitch 600.

In one embodiment, the first coupling member 108 is coupled to the front end 502 and the second coupling member is coupled to the aircraft tractor hitch 600. In an alternative embodiment, the first coupling member 108 may be coupled to the rear end 504 and the second coupling member 110 may be coupled to the aircraft tractor hitch 600. The coupling members 108 and 110 may be coupled to the aircraft tractor 500 and hitch 600 in a multitude of ways, such as, for example, bolts, fasteners, adhesives, etc. Preferably, such fasteners/couplers are rugged and adapted to withstand repeated and continuous high-stress forces associating with towing aircraft. The aircraft tractor hitch 600 may include a hitch pin 602 on which a tow bar coupler 604 is slidably coupled to.

Figure 7:
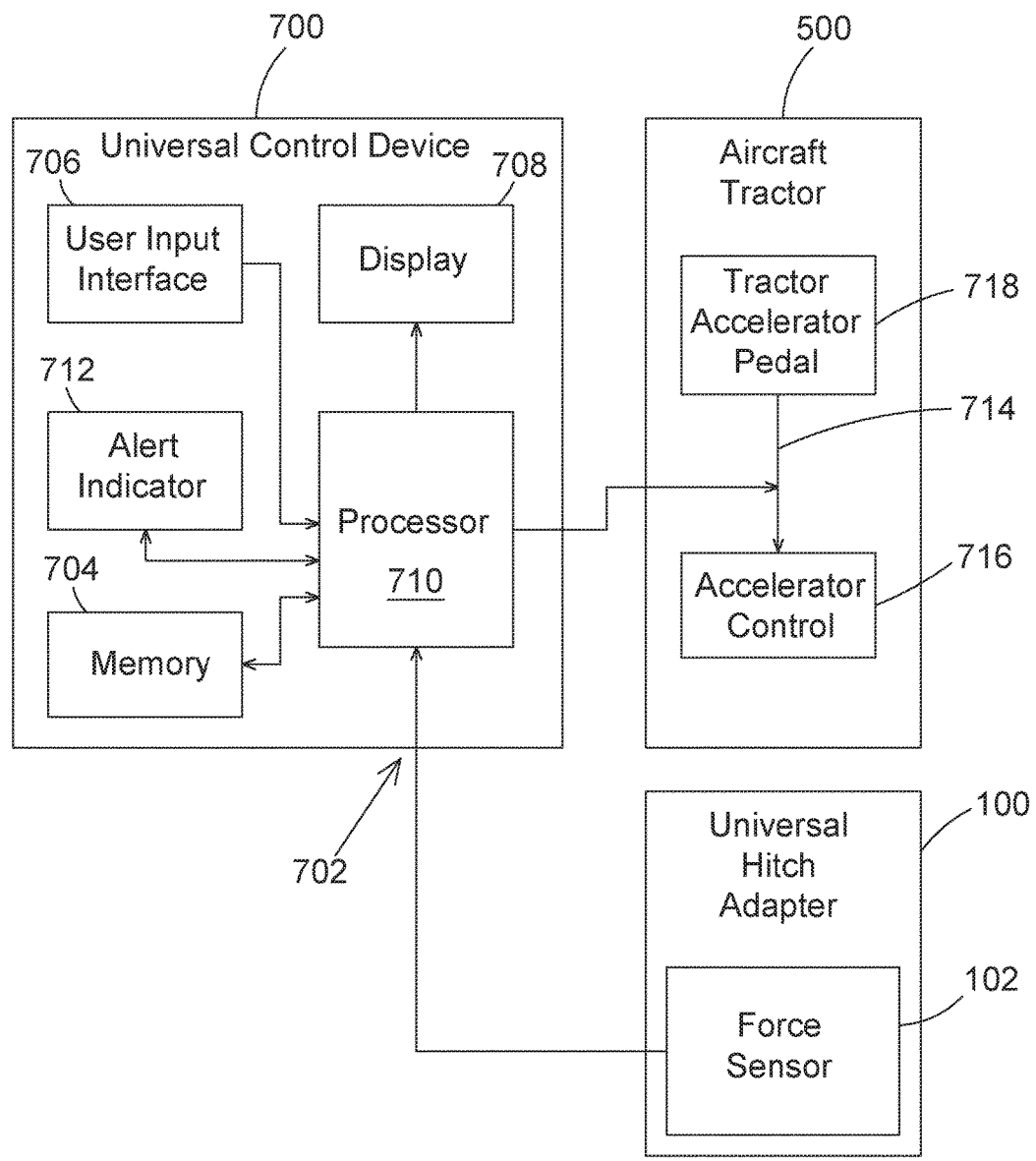
FIG. 7 is a block diagram view of a universal hitch adapter system in accordance with an exemplary embodiment of the present invention.
Figure 8:
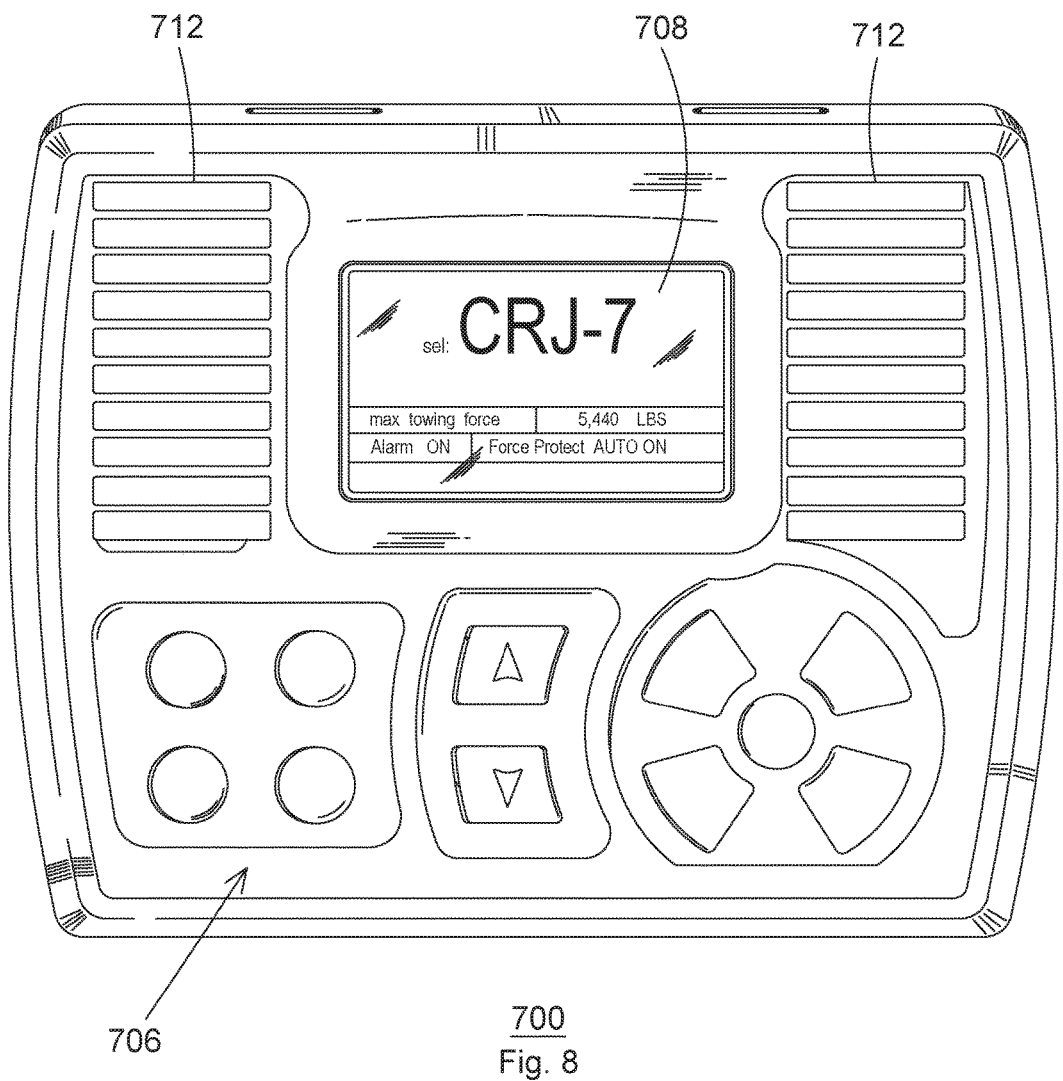
FIG. 8 is a front perspective view of an exemplary universal control device in accordance with an embodiment of the present invention.

Referring now to FIGS. 7 and 8, an exemplary universal hitch adapter system is illustrated in a block diagram view and a front perspective view, respectively. In one embodiment, the universal hitch adapter system may include the force sensor 102, as well as, a universal control device 700 communicatively coupled to the force sensor 102. In one embodiment, the force sensor 102 and the universal control device 700 are connected via a wired connection (e.g., conductor, cable, wiring, etc.). In another embodiment, the force sensor 102 and the universal control device 700 are connected via a wireless connection. The universal control device 700 may be a hand-held device shaped to be portably used by the tractor driver/user. An exemplary embodiment of a hand held universal control device 700 is illustrated in FIG. 8. In another embodiment, the universal control device 700 may be formed as a control panel installed within a dashboard associated with the aircraft tractor 500.

In one embodiment, the universal control device 700 may include at least one input 702 (e.g., i/o port) operable to receive force measurements from the force sensor 102. Conductors/wires communicatively coupling the force sensor 102 to the universal control device 700, in some embodiments, may be routed internally through the aircraft tractor 500 to the dashboard. In other words, the wiring may extend from the hitch area of the aircraft tractor 500 to the dashboard area in which the universal control device 700 may be disposed.

In one embodiment, the universal control device 700 may include a memory 704, a user input interface 706, a display 708, at least one processor 710, and an alert indicator 712. In other embodiments, the universal control device 700 may include additional features, or exclude some of the listed features. For example, in one embodiment, the alert indicator 712 may be provided as a separate device and may be disposed in an area outside of the dashboard area of the aircraft tractor 500.

In one embodiment, the memory 704 is a non-transitory memory operable to store a plurality of aircrafts thereon. The plurality of aircrafts may be stored on the non-transitory memory 704 so as to allow the driver to readily select one of the aircrafts that he/she is preparing to tow. The plurality of aircrafts may be stored on the memory 704 as the aircraft's commercial name, or some other representation, such as an alphanumeric code. Preferably, the aircrafts are stored in the memory 704 so that the aircrafts can be displayed on the display 708 as an easily recognizable name (e.g., CRJ700) for the driver to readily identify and select. Advantageously, by providing a menu of pre-stored aircraft names/indicators that the user may be able to scroll through, for example, and select, aircraft tractor drivers, who sometimes have limited training and skill, can safely tow expensive aircrafts without damaging the shear pin and/or nose gears. As will be described in more detail herein below, the inventive universal control device and hitch adapter system allows an unskilled driver to receive audible and/or visual alerts responsive to a sheer pin breaking force threshold determined/calculated by the universal control device 700 according to the particular aircraft selected at any given time. This elegant solution can greatly increase the efficiency, costs, and safety associated with air travel.

The user input interface 706 may be operable to receive a user's selection of one of the plurality of aircrafts stored in the memory 704. The user input interface 706 can include a keypad, a pointing device, a keyboard, a mouse, and/or the like. The user input interface 706 can be any device(s) that allow the user to enter input commands into the universal control device 700. In one embodiment, the user input interface 706 is a touch screen associated with the display 708 of the universal control device 700 and there can be icons or buttons displayed on the touch screen that the user can engage/depress/tap in order to select one of the plurality of aircrafts that are presented to the user. Exemplary buttons or icons associated with the user input interface 706 may include an on/off button for the audible portion of an alert, an on/off button for activating an auto force feature, scrolling up/down buttons, power on, power off, backlight intensity adjustment buttons, a back button for the menu, a menu button to bring up the menu on the display 708, a data download button for downloading data (e.g., force measurements), etc. In one embodiment, all of the force measurement data may be stored in the non-transitory memory 704 and download able via a data download output port (e.g., USB connection). In one embodiment, where, for example, the aircraft being towed is not pre-stored/pre-determined in the memory 704, the user may be provided with an option to input a shear pin breaking force threshold. The processor 710 may receive the user input parameter and may be operable to emit an alert as a result of the user-input threshold.

The plurality of aircrafts can be presented on the display 708 in addition to any other information (e.g., shear pin breaking force threshold parameters, indicators, alerts, other status, etc.). The display 708 can be any type of suitable display, such as a liquid-crystal display (LCD), a plasma display, a light-emitting diode (LED) display, or the like, that may be used to present various images, text, graphics, and/or videos to the user.

The processor 710 can be, for example, a central processing unit (CPU), a microcontroller, or a microprocessing device, including a "general purpose" microprocessing device or a special purpose microprocessing device. The processor 710 executes code stored in a memory, such as, for example, the memory 704 in order to carry out operation/instructions of the universal control device 700. The processor 710 may provide the processing capability to execute an operating system, run various applications, and provide processing for one or more of the techniques described herein.

In one embodiment, the processor 710 is communicatively coupled to the input 702, the memory 704, and the user input interface 706 and is operably configured to determine, based on the user's selection of one of the plurality of aircrafts, at least one shear pin breaking force threshold value. In one embodiment, the maximum shear pin breaking force threshold for the shear pin associated with the aircraft may be pre-stored in the memory 704, as the specifications for these shear pins are generally pre-determined by the manufacturer of the shear pins. In one embodiment, the processor 710 may determine a plurality of shear pin breaking force threshold values based on the maximum shear pin breaking force threshold provided by the manufacturer. For example, the maximum shear pin breaking force threshold value for a shear pin associated with the CRJ-7 aircraft is 5,440 lbs. Accordingly, the processor 710 may be configured to output, for example, a yellow alert for force measurements within 10% of the maximum threshold, a red alert for force measurements within 5% of the maximum threshold, and a green alert status for any other force measurements received from the force sensor 102. It should be understood that there are a variety of different threshold determinations/alerts that the processor 710 may be configured with.

The alert indicator 712 can be formed as a speaker, providing, an audio alert. In another embodiment, the alert indicator 712 can also be a visual alert (e.g., LED, lighting element, flashing icon on the display 708, etc.). Preferably, the alert indicator 712 includes both a visual and an audible alert aspect to provide maximum indication of the potential safety/damage issue. The alert indicator 712 may be communicatively coupled to the processor 710 and operably configured to emit an alert as a result of the force sensor 102 measuring a force transmitted on an aircraft tow bar 606 coupled to the aircraft tractor hitch 600 (FIG. 6) that meets or exceeds the shear pin breaking force threshold value. In one embodiment, the processor 710 and the alert indicator 712 are both integrated into the aircraft tractor 500.

In one embodiment, if the force measurements from the force sensor 102 meet or exceed a critical threshold value or range (e.g., 1% of the maximum breaking force threshold value), the processor 710 may automatically prevent acceleration of the aircraft tractor 500. In one embodiment, the processor 710 may be communicatively coupled to an electronic control line 714 for the aircraft tractor's accelerator control 716. The accelerator control 716 may be coupled to an accelerator pedal 718. Accordingly, in one embodiment, the processor 710 may be operable to automatically prevent acceleration of the aircraft tractor 500, via the electronic control line 714, as a result of the force sensor 102 measuring a force that meets or exceeds the shear pin breaking force threshold. In a further embodiment, the universal control device 700 may be operably configured and disposed to prevent acceleration signals from the accelerator pedal 718 from reaching the accelerator control 716. In another embodiment, the processor 710 may be operable to automatically prevent acceleration of the aircraft tractor 500, via the electronic control line 714, as a result of the force sensor 102 sensing an aircraft load without the processor 710 having received the user's selection of one of the plurality of aircrafts. In other words, the universal control device 700 may be operably configured to force tractor driver's to select an aircraft so that the threshold value can be determined before the aircraft tractor 500 can be safely accelerated while towing an aircraft. If an aircraft load is not detected, the universal control device 700 may be operable to freely permit driver acceleration.

Figure 9:
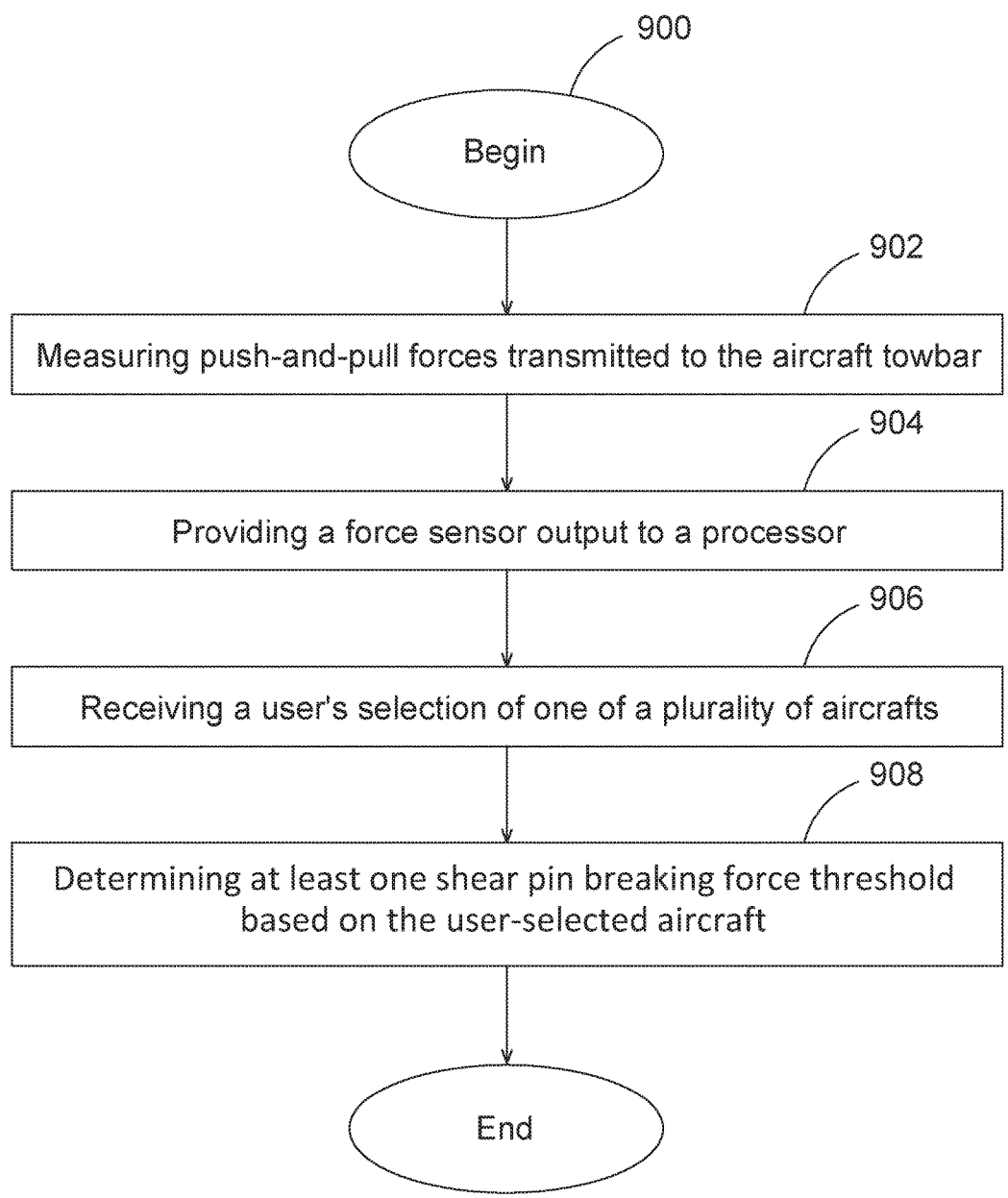
FIG. 9 is an exemplary process in accordance with the present invention.
Figures 10, 11:
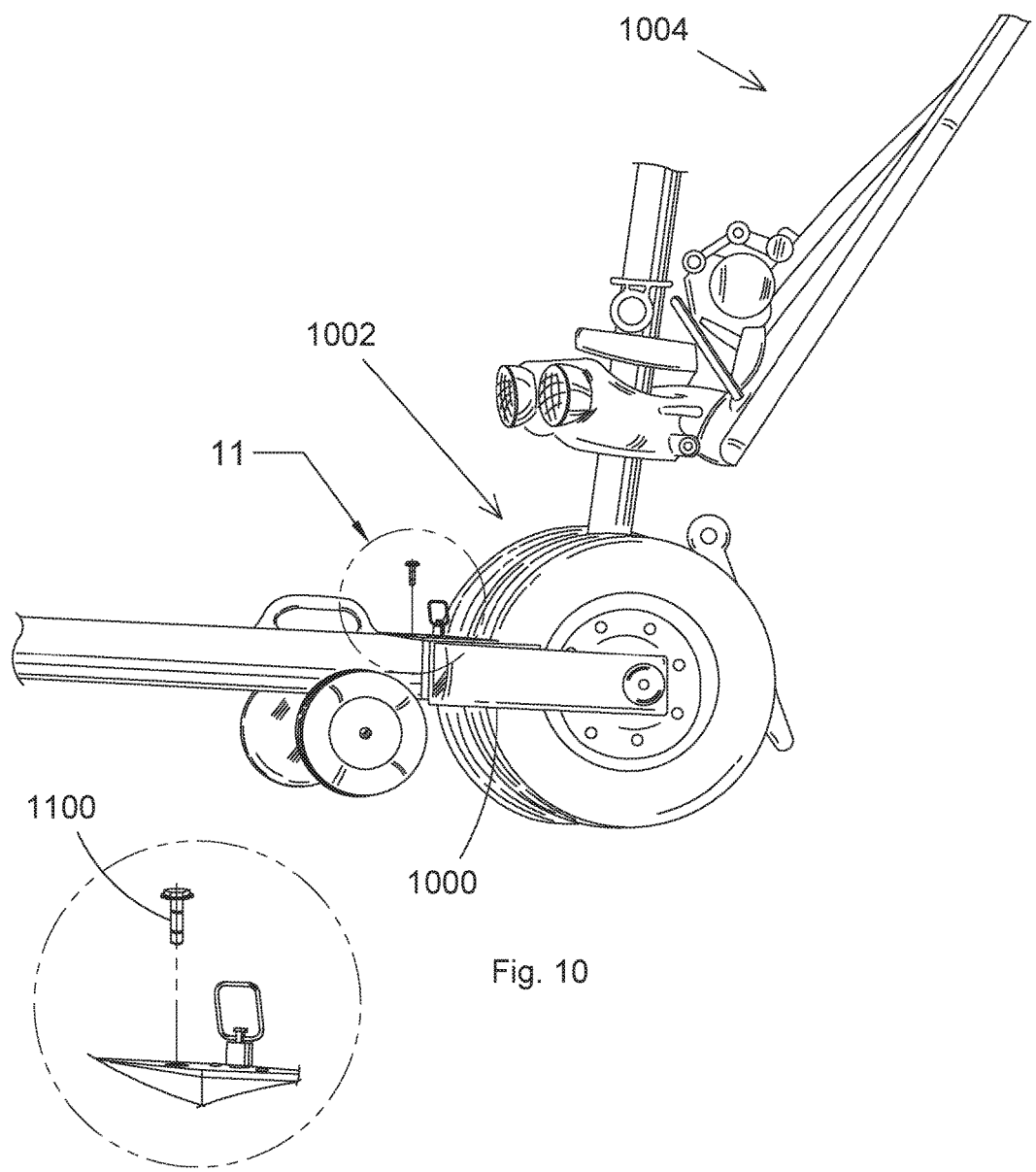
FIG. 10 is an enlarged view of a tow bar head and a shear pin coupled to the aircraft introduced in FIG. 5 in accordance with an exemplary embodiment of the present invention.
FIG. 11 is an enlarged view of the tow bar head and the shear pin depicted in FIG. 10 in accordance with an exemplary embodiment of the present invention.

An exemplary process for an aircraft tractor to safely tow aircrafts in accordance with the present invention will be described in conjunction with the process flow chart of FIG. 9, with reference to FIGS. 6-7 and 10-14. Although FIG. 9 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 9 for the sake of brevity. In some embodiments, some or all of the process steps included in FIG. 9 can be combined into a single process step.

The process may begin at step 900 and may immediately proceed to step 902, where the force sensor 102 disposed at the aircraft tractor hitch area may continuously measure push-and-pull forces transmitted on the aircraft tow bar 606. In one embodiment, prior to step 902, the aircraft tractor driver (or passenger or other associated airport employee/contractor) may couple the aircraft tow bar 606 to the hitch 600. More particularly, the driver may slide the hitch pin 602 through an aperture defined by the tow bar coupler 604 and secure the hitch pin 602. In addition, the driver may also couple a tow bar head 1000 of the aircraft tow bar 606 to a nose gear 1002 of an aircraft 1004 according to known methods and apparatuses. The driver may secure the tow bar head 1000 to the nose gear 1002 by coupling a shear pin 1100 to the tow bar head 1000. In one embodiment, the shear pin 1100 may slide through an aperture defined by a portion of the tow bar head 1000. It is this shear pin 1100 that embodiments of the present invention are particularly configured to prevent breakage of.

In an alternative embodiment of the inventive aircraft tractor 500, an aircraft tractor hitch 1300 may be formed as a multi-level hitch. In such an embodiment, the universal hitch adapter 100 may include more than one force sensor 102. For example, the universal hitch adapter 100 may include two force sensors 102a-b to detect multi-level push-and-pull forces. Such multi-level hitches are sometimes used to tow particularly large aircrafts.

In step 904, the force sensor 102 may provide a force sensor output, i.e., force measurements, to the processor 710. In one embodiment, the force sensor 102 may continuously provide force sensor outputs to the processor 710 for continuously monitoring for potential breakage conditions (e.g., force measurements exceeding or meeting the threshold values).

In step 906, the processor 710 may receive a user's (e.g., driver's) selection of one of the plurality of aircrafts stored in the memory 704. In step 908, the processor 710 may determine at least one shear pin breaking force threshold associated with the user-selected aircraft. In one embodiment, the processor 710 may retrieve from the memory 704 a pre-stored/pre-determined shear pin breaking force threshold stored in the memory 704 and associated in the memory 704 with the user-selected aircraft.

In one embodiment, the alert indicator 712 automatically provides an alert (audible and/or visual) as a result of the force sensor 102 measuring a force that meets or exceeds the shear pin breaking force threshold. In a further embodiment, the processor 710 may revise (determine another) the shear pin breaking force threshold based on the user's second selection of a second one of the plurality of aircrafts stored in the memory 704. The first aircraft may be considered different from the second aircraft. Accordingly, when the driver is ready to couple the aircraft tractor 500 to another aircraft for towing purposes, the driver need merely select another aircraft that he is preparing to tow. This allows the aircraft tractor 500 to safely tow a multitude of different aircrafts without breaking or wearing down the shear pin in an efficient and easily accessible manner and without requiring the driver to self-monitor such safety conditions.

A novel and efficient universal aircraft tractor hitch adapter system has been disclosed that greatly increases air travel safety, increases aircraft towing efficiency, and decreases costs associated with shear pin and nose gear breakage/malfunctions. Embodiments of the invention provide a force sensor coupled to an aircraft tractor hitch that transmits push-and-pull force measurements to a universal hitch adapter control panel. In addition, embodiments of the invention provide that the universal hitch adapter control panel include a memory storing a plurality of aircrafts thereon and a user input interface that allows a user (e.g., an aircraft tractor driver) to select one of the plurality of aircrafts that he/she is currently preparing to tow. In embodiments of the present invention, the universal hitch adapter control panel may also include a processor that determines at least one sheer pin breaking force threshold based on the driver's selected aircraft. Additional embodiments of the present invention include an alarm that alerts the aircraft tractor driver as a result of the processor determining that a measured push-and-pull force from the force sensor has met or exceeded the sheer pin breaking force threshold determined by the processor.

What is claimed is:

1. An aircraft tractor comprising:
   a front end and a rear end opposite the front end;
   an aircraft tractor hitch; and
   a universal hitch adapter system including:
   at least one force sensor disposed between one of the front end and the rear end and the aircraft tractor hitch;
   at least one input operable to receive force measurements from the at least one force sensor;
   a memory storing information for each of a plurality of aircrafts thereon;
   a user input interface operable to receive a user's selection of the information for one of the plurality of aircrafts stored in the memory; and
   at least one processor communicatively coupled to the at least one input, the memory, and the user input interface and operably configured to determine, based on the user's selection of the information for the one of the plurality of aircrafts, at least one shear pin breaking force threshold.

2. The aircraft tractor in accordance with claim 1, further comprising:
   an indicator communicatively coupled to the at least one processor and operably configured to emit an alert as a result of the at least one force sensor measuring a force transmitted on an aircraft towbar coupled to the aircraft tractor hitch that meets or exceeds the at least one shear pin breaking force threshold.

3. The aircraft tractor in accordance with claim 1, further comprising:
   an accelerator pedal; and
   an electronic control line communicatively coupled to the accelerator pedal; and
   wherein the at least one processor is communicatively coupled to the electronic control line and the at least one processor is further operable to automatically prevent acceleration of the aircraft tractor, via the electronic control line, as a result of the at least one force sensor measuring a force that meets or exceeds the at least one shear pin breaking force threshold.

4. The aircraft tractor in accordance with claim 1, further comprising:
   an accelerator pedal; and
   an electronic control line communicatively coupled to the accelerator pedal; and
   wherein the at least one processor is communicatively coupled to the electronic control line and the at least one processor is further operable to automatically prevent acceleration of the aircraft tractor, via the electronic control line, as a result of the at least one force sensor sensing an aircraft load without the at least one processor having received the user's selection of the information for the one of the plurality of aircrafts.

5. The aircraft tractor in accordance with claim 1, wherein:
   the universal hitch adapter further includes a steel insert operably configured to support the at least one force sensor, the steel insert including a first coupling member and a second coupling member opposite the first coupling member with the at least one force sensor interposed therebetween; and
   the first coupling member is coupled to the front end of the aircraft tractor and the second coupling member is coupled to the aircraft tractor hitch.

6. The aircraft tractor in accordance with claim 5, wherein:
   the steel insert is of a hardened steel material.

7. The aircraft tractor in accordance with claim 5, wherein:
   the steel insert further comprises at least two parallel stress plates, each of the at least two parallel stress plates defining an aperture through which the at least one force sensor is disposed and each of the at least two parallel stress plates translatable relative to one another about the at least one force sensor so as to impart push-and-pull forces from an aircraft towbar on the at least one force sensor.

8. A universal aircraft tractor hitch adapter system comprising:
   at least one force sensor disposed between one of a front end and a rear end of an aircraft tractor and an aircraft tractor hitch; and
   a universal control device including:

at least one input operable to receive force measurements from the at least one force sensor;

a memory storing information for each of a plurality of aircrafts thereon;

a user input interface operable to receive a user's selection of the information for one of the plurality of aircrafts stored in the memory; and at least one processor communicatively coupled to the at least one input, the memory, and the user input interface and operably configured to determine, based on the user's selection of the information for the one of the plurality of aircrafts, at least one shear pin breaking force threshold.

9. The universal aircraft tractor hitch adapter system in accordance with claim 8, wherein:

the at least one processor is operably configured to transmit an alert as a result of the at least one force sensor measuring a force transmitted on an aircraft towbar coupled to the aircraft tractor hitch that meets or exceeds the at least one shear pin breaking force threshold.

10. The universal aircraft tractor hitch adapter system in accordance with claim 9, further comprising:

a steel insert operably configured to support the at least one force sensor, the steel insert including a first coupling member and a second coupling member opposite the first coupling member with the at least one force sensor interposed therebetween, the first coupling member coupled to the front end of the aircraft tractor and the second coupling member coupled to the aircraft tractor hitch.

11. The universal aircraft tractor hitch adapter system in accordance with claim 10, wherein:

the steel insert further comprises at least two parallel stress plates, each of the at least two parallel stress plates defining an aperture through which the at least one force sensor is disposed and each of the at least two parallel stress plates translatable relative to one another about the at least one force sensor so as to impart push-and-pull forces from the aircraft towbar on the at least one force sensor.

12. The universal aircraft tractor hitch adapter system in accordance with claim 11, wherein:

the steel insert is of a hardened steel material.

13. The universal aircraft tractor hitch adapter system in accordance with claim 9, wherein:

the at least one processor is communicatively coupled to an electronic control line for an accelerator pedal of the aircraft tractor and the at least one processor is further operable to automatically prevent acceleration of the aircraft tractor, via the electronic control line, as a result of the at least one force sensor measuring a force that meets at or exceeds the at least one shear pin breaking force threshold.

14. The universal aircraft tractor hitch adapter system in accordance with claim 9, wherein:

the at least one processor is further operable to automatically prevent acceleration of the aircraft tractor as a result of the at least one force sensor sensing an aircraft load without the at least one processor having received the user's section of the information for the one of the plurality of aircrafts.

15. A method for an aircraft tractor to safely tow aircrafts, the method comprising steps of:

measuring, by a force sensor disposed between one of a front end and a rear end of an aircraft tractor and an aircraft tractor hitch coupled to an aircraft towbar, push-and-pull forces transmitted on the aircraft towbar;

providing a force sensor output, by the force sensor, to at least one processor;

receiving, by the at least one processor, a user's first selection of information for one of a plurality of aircrafts stored in a memory communicatively coupled to the at least one processor;

determining, by the at least one processor, at least one shear pin breaking force threshold associated with the user's first selection of the information for the one of the plurality of aircrafts; and providing, by an indicator communicatively coupled to the at least one processor, an alert as a result of the force sensor measuring a force that meets or exceeds the at least one shear pin breaking force threshold.

16. The method in accordance with claim 15, further comprising a step of:

integrating the at least one processor and the indicator into an aircraft tractor.

17. The method in accordance with claim 15, further comprising steps of:

coupling a towbar head of the aircraft towbar to a nose gear of an aircraft; and coupling a shear pin to the towbar head.

18. The method in accordance with claim 15, further comprising:

revising, by the at least one processor, the at least one shear pin breaking force threshold based on a user's second selection of information for a second one of the plurality of aircrafts, different from the user's first selection of the information for the one of the plurality of aircrafts.

19. The method in accordance with claim 15, further comprising a step of:

automatically preventing, by the at least one processor, acceleration of an aircraft tractor on which the force sensor is disposed as a result of the force sensor measuring a force that meets or exceeds the at least one shear pin breaking force threshold.

20. The method in accordance with claim 15, further comprising a step of:

receiving, by the at least one processor, a shear pin breaking force threshold input by the user.

* * * * *